United States Patent [19]

Kranzler et al.

[11] 3,880,015

[45] Apr. 29, 1975

[54] SHIFTING ARRANGEMENT, PARTICULARLY FOR EFFECTING AXIAL SHIFTING OF GEARS

[75] Inventors: Ernst Kranzler, Stetten; Gerhard Kuhlmann, Stuttgart, both of Germany

[73] Assignee: Robert Bosch G.m.b.H., Stuttgart, Germany

[22] Filed: Mar. 27, 1974

[21] Appl. No.: 455,204

[30] Foreign Application Priority Data

May 14, 1973 Germany.............................. 7318088

[52] U.S. Cl................ 74/337.5; 74/473; 74/568 R
[51] Int. Cl................................................ F16h 5/04
[58] Field of Search............ 74/569, 568 R, 567, 49, 74/50, 99 A, 99 R, 473, 337.5; 192/114 R

[56] References Cited
UNITED STATES PATENTS 2,598,690 6/1952 Hardcastle et al.................. 74/99 X
3,178,955 4/1965 Enders et al.................. 74/337.5 X

*Primary Examiner*—Samuel Scott
*Assistant Examiner*—F. D. Shoemaker
*Attorney, Agent, or Firm*—Michael S. Striker

[57] ABSTRACT

A part is mounted for movement along a predetermined path between two positions. A rotatable engaging unit engages the part and is operative, upon rotation from a first to a second angular position through an intermediate neutral position, for moving the part from one to the other of the two positions thereof. A displacing unit is comprised of a stationary cam arrangement contacting the rotatable engaging unit to cause the engaging unit to shift in one axial direction when rotating from the first to the neutral position thereof and in opposite axial direction when rotating from the neutral to the second position thereof.

14 Claims, 6 Drawing Figures

SHIFTING ARRANGEMENT, PARTICULARLY FOR EFFECTING AXIAL SHIFTING OF GEARS

BACKGROUND OF THE INVENTION

The invention relates to switching devices for effecting shifting of parts mounted for shifting movement in direction lengthwise of a shaft or axle on which such parts are mounted, for example to effect shifting of a pair of transmission gears jointly mounted upon a common axle, and especially to effect such shifting by manipulation of a rotating control knob.

It is known to effect such axial shifting of transmission gears by means of a shifting rod or a shifting fork, in order to establish different transmission ratios for a transmission arrangement. The known gear shifting arrangements are very complicated and accordingly expensive to produce.

SUMMARY OF THE INVENTION

It is an object of the invention to provide a shifting arrangement of exceptionally simple construction and so designed as to make unlikely the development of dangerous situations when the shifting arrangement is inadvertently actuated.

This object, and others which will become more understandable from the following description of an exemplary embodiment, can be met, according to one advantageous concept of the invention, by providing an arrangement comprised of a part mounted for movement along a predetermined path between two positions. Rotatable engaging means engages the part and is operative, upon rotation from a first to a second angular position through an intermediate neutral position, for moving the part from one to the other of the two positions thereof. Displacing means including stationary cam means contacting the rotatable engaging means is operative for causing the engaging means to shift in one axial direction when rotating from the first to the neutral position thereof and in the opposite axial direction when rotating from the neutral to the second position thereof.

The invention is especially advantageous if the engaging means is comprised of a rotatable member and an engagement pin extending into the space intermediate two axially spaced transmission gears mounted on a common shaft for shifting movement in direction lengthwise of such shaft. If the engaging means is inadvertently hit and pressed inwards, the engaging pin will move past the gear shaft, with the transmission gears necessarily moving from an operative position into a neutral position. As a result, the development of dangerous operating conditions is avoided.

The novel features which are considered as characteristic for the invention are set forth in parrticular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1b is a side view of the arrangement as shown in FIG. 1a;

FIG. 2b is a side view of the arrangement as shown in FIG. 2a;

FIG. 3b is a side view of the arrangement as shown in FIG. 3a.

DESCRIPTION OF THE PREFERRED EMBODIMENTS

Two transmission gears 12 and 13 of different diameters are rigidly connected by a tubular member 11. The assembly 11, 12, 13 is mounted on a gear shaft 10, slidable along the length of the shaft 10.

Figure 1A:
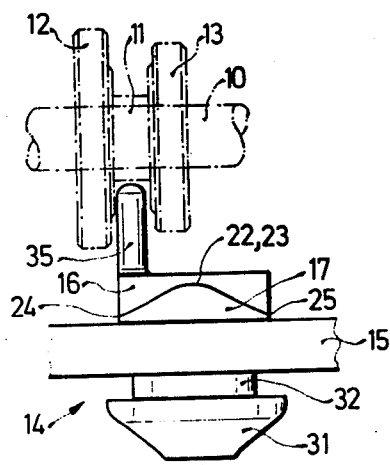
FIG. 1a is a front view of a gear-shifting arrangement according to the invention, in a first operative position.
Figure 1B:
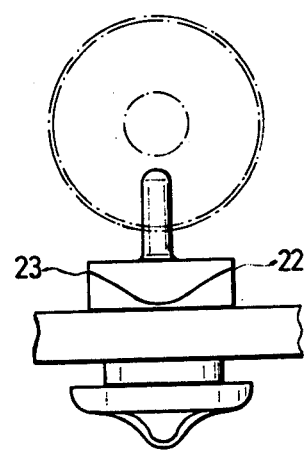
Figure 2A:
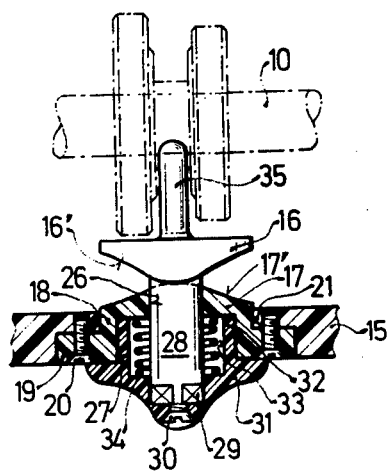
FIG. 2a is a front sectional view of the arrangement shown in FIGS. 1a and 1b, but in the intermediate neutral position.
Figure 2B:
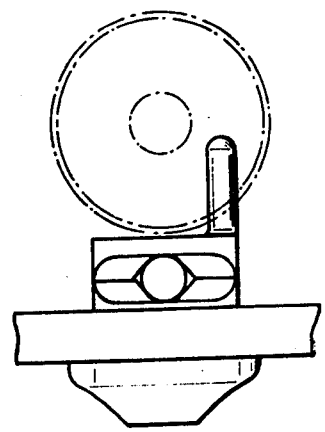
Figure 3A:
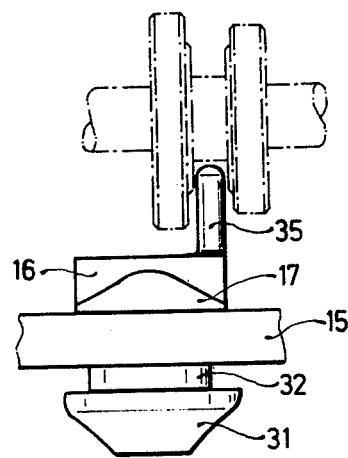
FIG. 3a is a front view of the arrangement shown in FIGS. 1a, 1b, 2a and 2b, but in the second operative position.
Figure 3B:
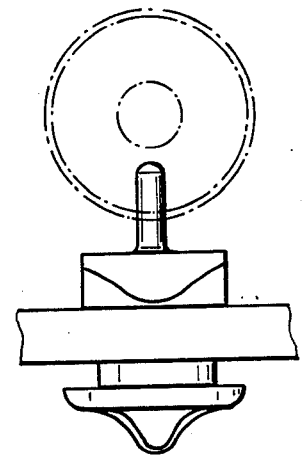

The gear arrangement 11, 12, 13 can be shifted by a gear-shifting arrangement, generally designated by reference numeral 14, from a first operative position shown in FIGS. 1a and 1b, through an intermediate neutral position shown in FIGS. 2a and 2b, to a second operative position shown in FIGS. 3a and 3b. The gear-shifting arrangement 14 is mounted on a wall 15 of a housing not completely illustrated.

The gear-shifting arrangement 14 is comprised of rotatable engaging means engaging the gear arrangement 11, 12, 13 and operative, upon rotation of the engaging means from a first to a second angular position through an intermediate neutral position, for shifting the gear arrangement 11, 12, 13 from one to the other of the two positions thereof. The gear-shifting arrangement 14 is furthermore comprised of displacing means including stationary cam means contacting the rotatable engaging means and operative for causing the engaging means to shift in one axial direction when rotating from the first position to the neutral position thereof and in opposite axial direction when rotating from the neutral position to the second position thereof.

The engaging means is comprised of a circular rotatable part 16 on which is mounted, near the periphery thereof, an engaging pin 35 extending into the space intermediate the axially spaced gears 12, 13. The cam means is comprised of a circular part 17. The circular part 17 is fixed on the housing wall 15 and is comprised of a cylindrical portion 18 and a flange-like portion 19, the flange-like portion 19 being mounted in a stepped bore 21 of the housing wall 15 by means of screws 20.

The circular part 17 of the cam means is generally cylindrical. The axial face of part 17 facing towards shaft 10 is provided with two projections 22, 23 located on opposite sides of the rotation axis of the part 17 and with two recesses 24, 25 located on opposite sides of the rotation axis of the part 16. This axial end surface 17' of part 17 curves substantially sinusoidally in direction circumferentially of the rotation axis, with the projections 22, 23 and recesses 24, 25 on the surface 17' thereof merging smoothly one into the other to form a continuous curved surface.

The circular part 17 of the cam means is provided with a central stepped bore, the symmetry axis of which intersects the central axis of the gear shaft 10 at a right angle. The smaller-diameter part of this stepped bore is designated with numeral 26, and the larger-diameter part with numeral 27. Passing through the bore 26 is a shaft-like continuation 28 of the rotating circular part 16 of the engaging means.

The part 16 is likewise of generally cylindrical configuration and has the same diameter as the part 17. The axial face 16' of the part 16 has a sinusoidally curving surface complementary to the surface 17' of part 17. The surface 16' and 17' are so configurated that they can fit exactly into each other, with the two projections of each of the facing surfaces 16', 17' being received in the two recesses of the other of the two facing surfaces 16', 17', when the circular part 16 is in a predetermined angular position relative to the cam part 17.

The lower end 29 of the shaft 28 is of quadratic cross-section, and a rotatable control knob 31 is mounted on this lower end 29 by means of a screw 30. Accordingly, the control knob 31 is rigidly connected with the circular rotating part 16 of the engaging means. The control knob 31 has a cylindrical portion 32 which is rotatably fit into the portion 27 of the stepped bore of the cam member 17. The cylindrical portion 32 of the control knob 31 has a hollow interior 33 in which is located a compression spring 34.

The circular rotatable part 16 of the engaging means has an axial end face on which is mounted the engaging pin 35, which projects into the space intermediate the pair of axially spaced gears 12, 13. The longitudinal center line of the engaging pin 35 intersects the longitudinal center line of the shaft 10, when the surfaces 16', 17' mate with each other, namely when the gear-shifting arrangement is in either the first or second position thereof. The rounded end portion of the engaging pin 35 in such position is spaced only a small distance from the hollow cylindrical member 11 connecting together the gears 12, 13.

In this position the compression spring 34 pushes the control knob 31 outwards, away from the housing wall 15. If the control knob is turned 90°, the shaft 28 and rotating circular part 16 will also turn 90°, into the neutral position of the gear-shifting arrangement, as shown in FIGS. 2a and 2b. In this position the projections of the curving surrface 16' will rest upon and bear against the projections of the curving surface 17', as shown in FIGS. 2a and 2b, so that the control knob 31 will be in retracted position. When the control knob 31 is turned 90° from the first position of FIGS. 1a, 1b the engagement pin 35 will push in rightwards direction against the inwardly facing axial side of the gear 13 to push the gear arrangement 11, 12, 13 in direction lengthwise of shaft 10 a predetermined corresponding distance, into the neutral position of the gear arrangement 11, 12, 13, corresponding to the intermediate neutral position of the rotating engaging means 31, 16, 35 shown in FIGS. 2a, 2b. In this neutral position, the gear 12 is out of mesh with a non-illustrated cooperating transmission gear.

If now the control knob 31 is turned 90° further, the complementary surfaces 16', 17' will again fit into each other, the control knob 31 will shift axially outwards away from housing wall 15, as shown in FIGS. 3a, 3b, and the engagement pin 35 will again push in rightwards direction against the inwardly facing axial side of the gear 13 to move the gear arrangement 11, 12, 13 still further in direction lengthwise of shaft 10, to the other operating position thereof. In this second operating position, the gear 13 meshes with a non-illustrated cooperating gear. This second operative position is shown in front and side views in FIGS. 3a and 3b.

As will be clear from the drawing and description, in the intermediate neutral position (FIGS. 2a, 2b) of the gear-shifting arrangement 14, the longitudinal centerline of the engagement pin 35 does not intersect the longitudinal centerline of the shaft 10. Its disposition has the following advantage: If the control knob 31 is either in the first position thereof (FIGS. 1a, 1b) or in the second position thereof (FIGS. 3a, 3b), and if the control knob 31 is inadvertently pressed inwards, for example as a result of being accidentally hit, the rounded end of the engagement pin 35 can pass by the connector member 11, bringing the gear-shifting arrangement and the gear arrangement 11, 12, 13 into the intermediate neutral positions thereof. This constitutes an important safety feature. In order to avoid a too easy transition of the two parts 16, 17 into the intermediate neutral position, the projections 22, 23 on the curved surface 17' can be somewhat flattened, or an indentation can be provided, to increase the stability of the first and second operating positions of the gear-shifting mechanism. The form of the curved surfaces 16', 17' need not be sinusoidal and can have different but functionally equivalent shapes.

It will be understood that each of the elements described above, or two or more together, may also find a useful application in other types of constructions differing from the types described above.

While the invention has been illustrated and described as embodied in a gear-shifting mechanism, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement comprised of a part mounted for movement along a predetermined path between two positions, in combination, rotatable engaging means engaging said part and operative, upon rotation from a first to a second angular position through an intermediate neutral position, for moving said part from one to the other of said two positions thereof; and displacing means including stationary cam means contacting said rotatable engaging means for causing said engaging means to shift in one axial direction when rotating from said first to said neutral position and in opposite axial direction when rotating from said neutral to said second position.

2. In an arrangement as defined in claim 1, wherein said part is comprised of a plurality of gears of a transmission system, said gears being mounted on a shaft and shiftable in direction lenghtwise of said shaft.

3. In an arrangement as defined in claim 1, wherein said engaging means and said cam means have respective facing surfaces oriented transverse to the rotation axis of said engaging means, the two facing surfaces each having two projections located on opposite sides of said axis and two recesses located on opposite sides of said axis, with the recesses and projections of each surface curving and merging smoothly into each other in direction circumferentially of said axis, with the recesses of each of the two surfaces receiving the projections of the other of the two surfaces when said engaging means is in either of said first and second positions, and with the projections of one of the two facing surfaces bearing against the projections of the other of the two facing surfaces when said engaging means is in said intermediate neutral position.

4. In an arrangement as defined in claim 3, wherein said engaging means is comprised of a circular rotatable portion provided with one of said facing surfaces, a control knob rigid with said circular rotatable portion, and an engaging pin rigid with said circular rotatable portion and engaging said part.

5. In an arrangement as defined in claim 4, wherein said part is mounted on a shaft and is shiftable in direction lengthwise of said shaft, and wherein said engaging pin is so oriented and so engages said part as to push said part in direction lengthwise of said shaft when said engaging means is rotated from said neutral position to said first position and to push said part in opposite direction when said engaging means is rotated from said neutral position to said second position.

6. In an arrangement as defined in claim 5, wherein said facing surfaces of said engaging means and of said cam means are so oriented and configurated that when said engaging means is rotated from said neutral position to either one of said first and second positions said circular rotatable portion moves in direction towards said shaft with said engaging pin moving from a position wherein the centerlines of said pin and of said shaft are perpendicular and coplanar to a position wherein said centerlines are perpendicular but spaced from each other in direction parallel to said shaft.

7. In an arrangement as defined in claim 3, wherein each of said facing surfaces curves substantially sinusoidally in direction circumferentially of said rotation axis of said engaging means.

8. In an arrangement as defined in claim 4, wherein said circular rotatable part of said engaging means is comprised of an elongated shaft passing through said cam means, with said control knob being rigidly connected to the end of said elongated shaft, with said control knob and said circular rotatable part being located on opposite sides of said cam means.

9. In an arrangement as defined in claim 3, wherein said displacing means further includes biasing spring means exerting upon said cam means and upon said engaging means a force tending to maintain said facing surfaces thereof in contact.

10. In an arrangement as defined in claim 3, wherein said displacing means further includes an axially disposed compression spring exerting upon said cam means and upon said engaging means a biasing force tending to move said engaging means into one of said first and second positions when said engaging means is located intermediate said neutral position and one of said first and second positions.

11. In an arrangement as defined in claim 4, wherein said part is comprised of a pair of axially spaced transmission gears mounted on said shaft and shiftable in direction lengthwise of said shaft, and wherein said engaging pin extends into the space intermediate said transmission gears and perpendicular to said shaft and is oriented to push against one of the two facing axial sides of said pair of gears when said engaging means is rotated from said neutral position to said first position and against the other of the two facing axial sides of said pair of gears when said engaging means is rotated from said neutral position to said second position.

12. In an arrangement as defined in claim 5, wherein said cam means and also said circular rotatable portion of said cam means are of generally cylindrical configuration of substantially equal diameter and coaxial and having axial end faces constituting said facing surface portions.

13. In an arrangement as defined in claim 12, wherein each of said facing surfaces curves substantially sinusoidally in direction circumferentially of said rotation axis of said engaging means.

14. In an arrangement as defined in claim 4, wherein said engaging pin is located near the radially outermost peripheral portion of said circular rotatable portion of said engaging means.

* * * * *